United States Patent
Minagawa et al.

(10) Patent No.: US 11,080,524 B2
(45) Date of Patent: Aug. 3, 2021

(54) IMAGE SENSOR WITH INSIDE BIOMETRIC AUTHENTICATION AND STORAGE

(71) Applicants: Sony Corporation, Tokyo (JP); Sony Semiconductor Solutions Corporation, Kanagawa (JP)

(72) Inventors: Yusuke Minagawa, Tokyo (JP); Go Asayama, Kanagawa (JP); Toru Akishita, Tokyo (JP); Hirotake Yamamoto, Kanagawa (JP); Shigeki Teramoto, Kanagawa (JP); Kazutaka Tachibana, Kanagawa (JP); Teiichi Shiga, Tokyo (JP); Hiroshi Suzuki, Saitama (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 22 days.

(21) Appl. No.: 16/317,927

(22) PCT Filed: May 30, 2017

(86) PCT No.: PCT/JP2017/019995
§ 371 (c)(1),
(2) Date: Jan. 15, 2019

(87) PCT Pub. No.: WO2018/016189
PCT Pub. Date: Jan. 25, 2018

(65) Prior Publication Data
US 2019/0156117 A1 May 23, 2019

(30) Foreign Application Priority Data
Jul. 22, 2016 (JP) .............................. JP2016-144164

(51) Int. Cl.
*G06K 9/00* (2006.01)
*G06F 21/32* (2013.01)
(Continued)

(52) U.S. Cl.
CPC ......... *G06K 9/00617* (2013.01); *G06F 21/32* (2013.01); *G06F 21/556* (2013.01);
(Continued)

(58) Field of Classification Search
CPC ...................... G06K 9/00617; G06K 9/00604; G06F 21/32; G06F 21/556; G06F 21/83;
(Continued)

(56) References Cited

U.S. PATENT DOCUMENTS 6,526,160 B1 2/2003 Ito
6,542,624 B1 4/2003 Oda
(Continued)

FOREIGN PATENT DOCUMENTS

EP 0 973 122 A2 1/2000
EP 0 986 209 A2 3/2000
(Continued)

OTHER PUBLICATIONS

Communication pursuant to Article 94(3) dated Feb. 19, 2020 in connection with European Application No. 17830709.6.
(Continued)

*Primary Examiner* — Gabriel I Garcia
(74) *Attorney, Agent, or Firm* — Wolf, Greenfield & Sacks, P.C.

(57) ABSTRACT

The present technology is to provide an image sensor capable of enhancing the security of biometric information and lowering the risk of information leakage.
An image sensor 10 includes: a biometric information acquisition unit 102 that acquires biometric information; a storage unit 14 that stores reference information to be compared with the biometric information; and a biometric authentication unit 104 that performs biometric authentication by comparing the biometric information with the reference information. The image sensor 10 further includes an
(Continued)

encryption processing unit 105 that encrypts biometric authentication information that authenticates a living organism.

9 Claims, 8 Drawing Sheets

(51) Int. Cl.
*G06T 1/00* (2006.01)
*G06F 21/55* (2013.01)
*G06F 21/83* (2013.01)
*G06T 7/00* (2017.01)
*H04L 9/32* (2006.01)
*H04N 5/369* (2011.01)

(52) U.S. Cl.
CPC ......... *G06F 21/83* (2013.01); *G06K 9/00604* (2013.01); *G06T 1/00* (2013.01); *G06T 7/00* (2013.01); *H04L 9/3231* (2013.01); *G06F 2221/2107* (2013.01); *H04N 5/379* (2018.08)

(58) Field of Classification Search
CPC ..... G06F 2221/2107; G06T 1/00; G06T 7/00; H04L 9/3231; H04N 5/379
USPC ......................................................... 382/115
See application file for complete search history.

(56) References Cited

U.S. PATENT DOCUMENTS

| | | | |
|---|---|---|---|
| 6,751,734 | B1 | 6/2004 | Uchida |
| 2007/0177771 | A1* | 8/2007 | Tanaka ................ G06F 19/3418 382/115 |
| 2013/0307670 | A1* | 11/2013 | Ramaci .................. G06Q 10/10 340/5.82 |
| 2013/0314208 | A1* | 11/2013 | Risheq ................... G07C 9/257 340/5.53 |
| 2015/0113632 | A1 | 4/2015 | Saito et al. |
| 2015/0326570 | A1* | 11/2015 | Publicover ............. H04N 5/247 726/4 |
| 2016/0019420 | A1 | 1/2016 | Feng et al. |

FOREIGN PATENT DOCUMENTS

| | | |
|---|---|---|
| EP | 1 693 774 A2 | 8/2006 |
| EP | 2 043 293 A1 | 4/2009 |
| GB | 2 348 309 A | 9/2000 |
| JP | 2000-033080 A | 2/2000 |
| JP | 2000-036036 A | 2/2000 |
| JP | 2001-119008 A | 4/2001 |
| JP | 2011-165102 A | 8/2011 |
| WO | WO 2016/010720 A1 | 1/2016 |

OTHER PUBLICATIONS

International Search Report and Written Opinion and English translation thereof dated Aug. 29, 2017 in connection with International Application No. PCT/JP2017/019995.

International Preliminary Report on Patentability and English translation thereof dated Jan. 31, 2019 in connection with International Application No. PCT/JP2017/019995.

International Search Report and English translation thereof dated Aug. 29, 2017 in connection with International Application No. PCT/JP2017/019995.

Shigematsu et al., "A Single-Chip Fingerprint Sensor and Identifier", IEEE Journal of Solid-State Circuits vol. 34, No. 12, Dec. 1999, http://ieeexplore.ieee.org/document/808910/>,<DOI: 10.1109/4.808910> retrieved on Aug. 15, 2017, pp. 1852-1859.

Extended European Search Report dated May 31, 2019 in connection with European Application No. 17830709.6.

* cited by examiner

IMAGE SENSOR WITH INSIDE BIOMETRIC AUTHENTICATION AND STORAGE

CROSS-REFERENCE TO RELATED APPLICATIONS

This is a U.S. National Stage Application under 35 U.S.C. § 371, based on International Application No. PCT/JP2017/019995, filed in the Japanese Patent Office as a Receiving office on May 30, 2017, which claims priority to Japanese Patent Application Number JP2016-144164, filed in the Japanese Patent Office on Jul. 22, 2016, each of which is hereby incorporated by reference in its entirety.

TECHNICAL FIELD

The present technology relates to an image sensor and an image processing system. More particularly, the present technology relates to an image sensor and an image processing system that perform biometric authentication.

BACKGROUND ART

Complementary metal oxide semiconductor (CMOS) image sensors, charge coupled device (CCD) image sensors, and the like are used these days as semiconductor imaging elements (image sensors) that convert light entering from lenses of industrial devices such as mobile terminals and digital cameras into electrical signals, for example. With such image sensors, biometric authentication using a small-size sensor mounted on a mobile terminal is being considered in the identity confirmation required in financial transactions such as mobile banking, for example.

In a case where this biometric authentication is performed, biometric information about the users needs to be protected, and a high-security biometric authentication process is required. Therefore, Patent Document 1 suggests a mobile terminal that transmits biometric image data imaged by an imaging means to an image processing server, receives biometric information generated from the biometric image data from the image processing server, and performs a matching process related to biometric authentication using an IC chip, for example.

CITATION LIST

Patent Document

Patent Document 1: Japanese Patent Application Laid-Open No. 2011-165102

SUMMARY OF THE INVENTION

Problems to be Solved by the Invention

According to the technology disclosed in Patent Document 1, however, biometric information is transmitted to an image processing server outside a mobile terminal. Therefore, even if the biometric information is encrypted, the biometric information might be monitored between the mobile terminal and the image processing server, and there is always a risk of poor security of biometric information.

The present technology has been made in view of such circumstances, and aims to provide an image sensor capable of enhancing the security of biometric information and lowering the risk of information leakage.

Solutions to Problems

To solve the above problem, an image sensor as an example of the present technology includes: a biometric information acquisition unit that acquires biometric information; a storage unit that stores reference information to be compared with the biometric information; and a biometric authentication unit that performs biometric authentication by comparing the biometric information with the reference information.

Further, an image processing system as an example of the present technology includes: an image sensor including: a biometric information acquisition unit that acquires biometric information; a storage unit that stores reference information to be compared with the biometric information; a biometric authentication unit that performs biometric authentication by comparing the biometric information with the reference information; an encryption processing unit that encrypts biometric authentication information that authenticates a living organism; and an encrypted information output unit that outputs encrypted information obtained by encrypting the biometric authentication information; and a processor that performs processing in accordance with the encrypted information output from the image sensor.

Effects of the Invention

According to the present technology, it is possible to provide an image sensor capable of enhancing the security of biometric information and lowering the risk of information leakage. Note that effects of the present technology are not limited to the above effect, and may include any of the effects described in the present disclosure.

MODE FOR CARRYING OUT THE INVENTION

The following is a description of preferred embodiments for carrying out the present technology, with reference to the accompanying drawings. Note that the embodiments described below are typical examples of embodiments of the present technology, and do not narrow the interpretation of the scope of the present technology. Explanation will be made in the following order.

Figure 1:
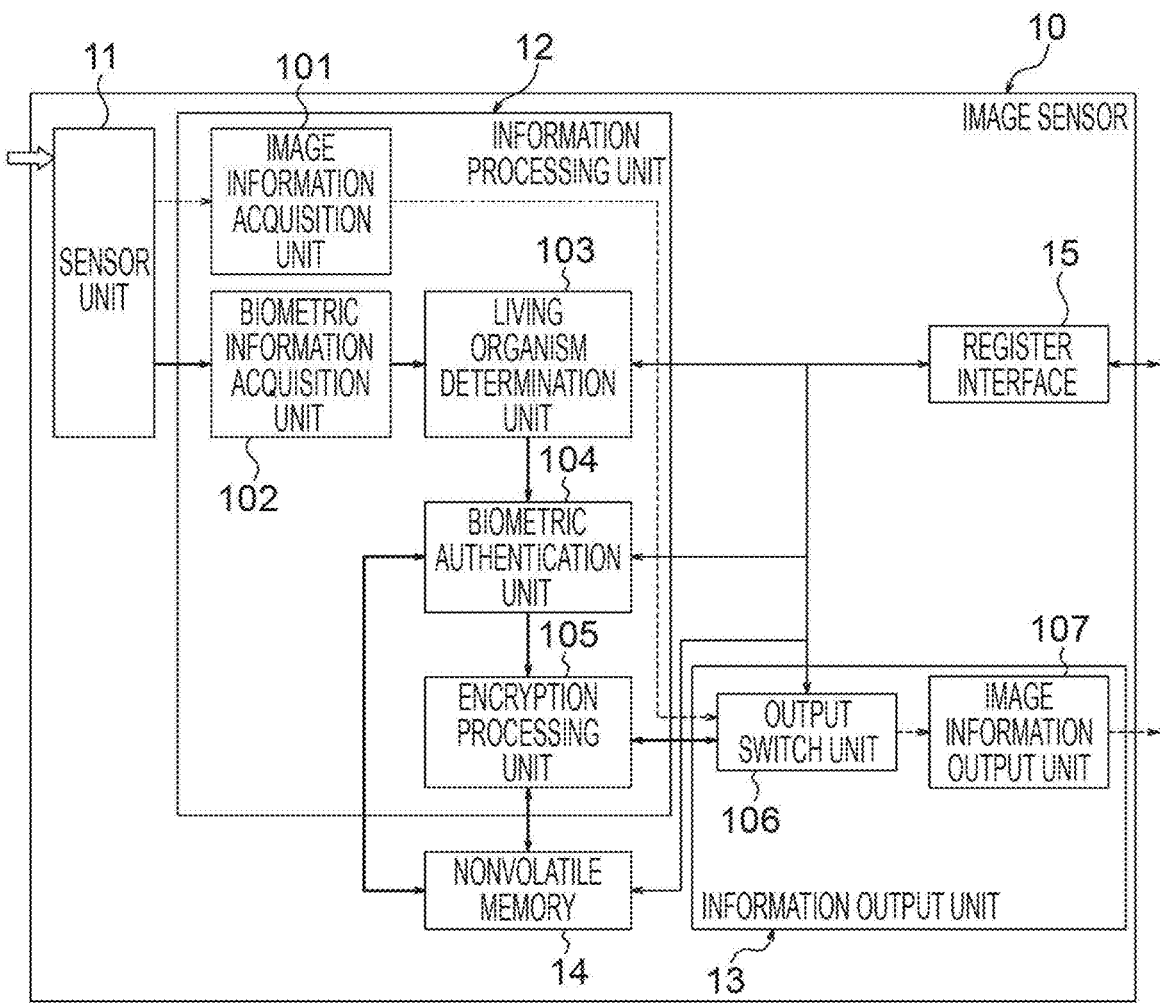
FIG. 1 is a block diagram showing an example configuration of an image sensor according to the present technology.

1. Example Configuration of an Image Sensor According to the Present Technology
2. Example Configuration of an Image Processing System According to the Present Technology
3. Biometric Authentication Process Using the Image Sensor According to the Present Technology
4. Example Configuration of an Image Sensor According to a Conventional Technology
5. Example Configuration of an Image Processing System According to the Conventional Technology
6. Biometric Authentication Process Using the Image Sensor According to the Conventional Technology
7. First Example Stack in an Image Sensor According to the Present Technology
8. Second Example Stack in an Image Sensor According to the Present Technology 1. Example Configuration of an Image Sensor According to the Present Technology FIG. 1 is a block diagram showing an example configuration of an image sensor according to an embodiment of the present technology. An image sensor 10 is a semiconductor imaging element that converts light entering from a lens of an industrial device such as a mobile terminal or a digital camera into an electrical signal. The image sensor 10 may be a complementary metal oxide semiconductor (CMOS) image sensor, a charge coupled device (CCD) image sensor, or the like, for example. Note that image sensors according to the present technology are not limited to this embodiment.

The image sensor 10 is capable of performing a biometric authentication process therein, and includes a sensor unit 11 that photoelectrically converts light from the object into an electrical signal, an information processing unit 12, an information output unit 13, and a nonvolatile memory 14 as a storage unit. The image sensor 10 also includes a register interface 15 that transmits and receives setting values to and from the outside.

Here, "the outside" may be a recording medium storing image information generated by the image sensor, a network for transmitting the image information, a main processor that processes the image information, the main body of an imaging apparatus such as a digital camera, a personal computer (PC), a mobile terminal, a game machine, a noncontact-type IC card such as FeliCa (registered trademark), a USB memory, or the like.

The information processing unit 12 processes acquired information as necessary, and includes an image information acquisition unit 101, a biometric information acquisition unit 102, a living organism determination unit 103, a biometric authentication unit 104, and an encryption processing unit 105.

The image information acquisition unit 101 performs analog-to-digital conversion (A/D conversion) to convert an electrical signal photoelectrically converted by the sensor unit 11 from an analog signal to a digital signal, in accordance with light from the object imaged by a user. By doing so, the image information acquisition unit 101 acquires image information.

The biometric information acquisition unit 102 performs A/D conversion on the electrical signal photoelectrically converted by the sensor unit 11 in accordance with the light of the object imaged to perform biometric authentication on the user. By doing so, the biometric information acquisition unit 102 acquires biometric information. Here, "biometric information" is information indicating features of a human body, such as an iris, a fingerprint, a vein, a face, a handprint, a voiceprint, a pulse wave, and a retina, for example.

The living organism determination unit 103 determines whether or not the acquired biometric information can authenticate the user.

The biometric authentication unit 104 compares the biometric information determined to be able to authenticate the user with the reference information stored in the nonvolatile memory 14, to determine whether or not the user has a right to usage.

The encryption processing unit 105 generates encrypted information by encrypting the authenticated biometric authentication information indicating that the user has a right to usage, and transmits the encrypted information to the information output unit 13.

The information output unit 13 outputs the information received from the information processing unit 12 to the outside, and includes an output switch unit 106 and an image information output unit 107.

The output switch unit 106 switches which information is to be output to the outside, in accordance with the type of the information input from the information processing unit 12. In other words, the output switch unit 106 serves as a switch that switches output destinations. As the image sensor 10 includes the output switch unit 106, it is possible for the user to select whether to output the image information described below or the encrypted information.

In a case where image information is selected as the information to be output through the output switch unit 106, the image information output unit 107 receives image information captured by the user and outputs the image information to the outside.

The nonvolatile memory 14 serves as a storage unit that holds the stored content without a power supply, and can store beforehand the reference information to be compared with biometric information acquired from the object. In this manner, the nonvolatile memory 14 can hold the reference information, regardless of whether there is a power supply. Thus, the image sensor 10 can perform a biometric authentication process by comparing the acquired biometric information with the reference information.

The register interface 15 transmits and receives setting values for executing the respective functions of the living organism determination unit 103, the biometric authentication unit 104, the encryption processing unit 105, and the nonvolatile memory 14. The register interface 15 also serves as an encrypted information output unit that acquires the encrypted information generated by the encryption processing unit 105 and transmits the encrypted information to a main processor 20 in a case where outputting the encrypted information is selected at the output switch unit 106. Here, the image information output unit 107 is an interface that outputs unencrypted image information to the outside, and the register interface 15 is an interface that outputs encrypted information. Therefore, the output band of the image information output unit 107 is wider than the output band of the register interface 15, which also serves as an encrypted information output unit.

Note that although the image sensor 10 of this embodiment includes the image information acquisition unit 101, the output switch unit 106, and the image information output unit 107, and is capable of outputting normal captured image information, an image sensor of the present technology does not need to include an image information acquisition unit, an output switch unit, and an image information output unit, as long as the image sensor can perform a biometric authentication process therein.

Figure 2:
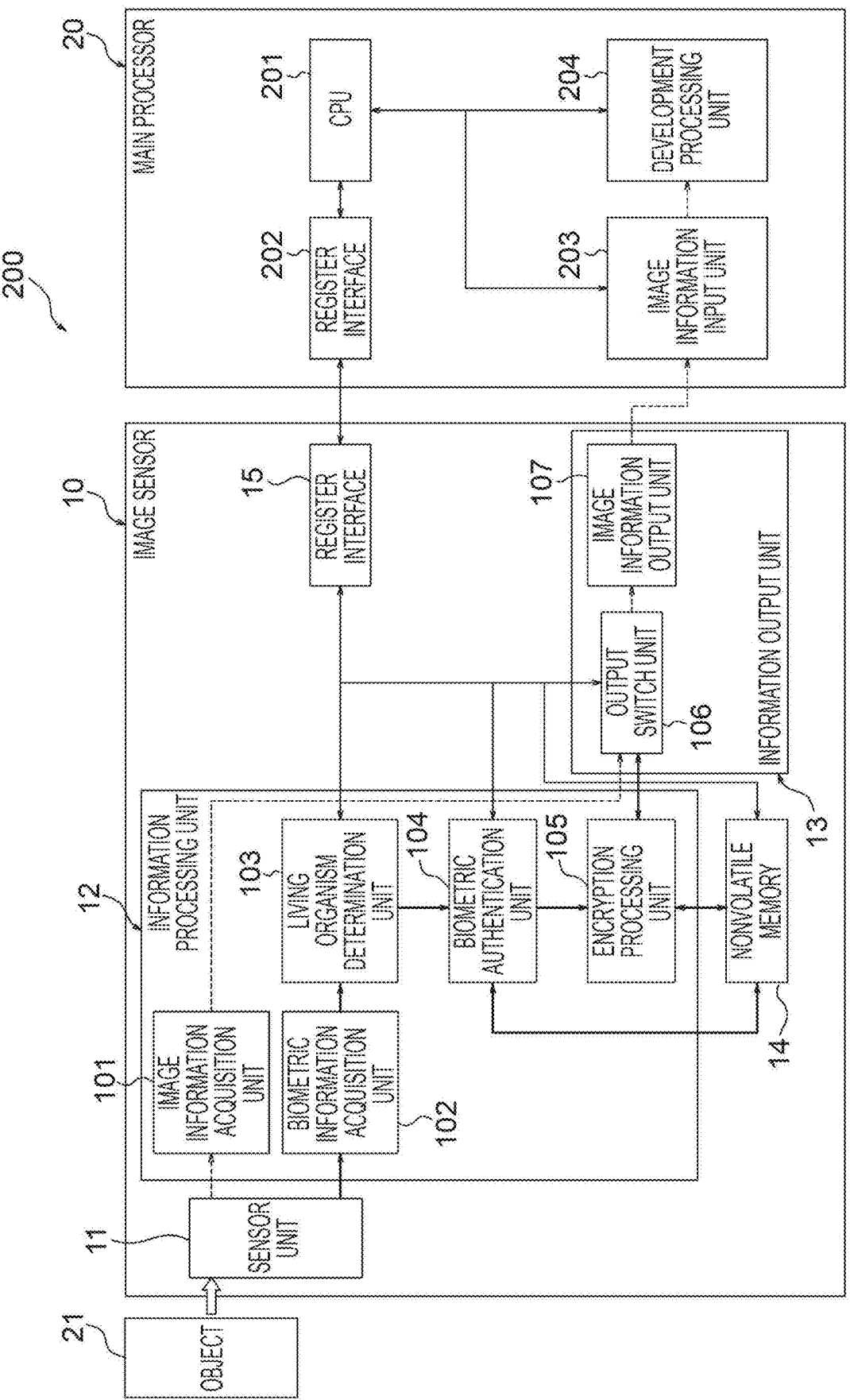
FIG. 2 is a block diagram showing an example configuration of an image processing system according to the present technology.

2. Configuration of an Image Processing System According to the Present Technology FIG. 2 is a block diagram showing an example configuration of an image processing system according to an embodiment of the present technology. An image processing system 200 is a system that can be used for a mobile terminal, a digital camera, a video camera, or the like, for example, and performs a development process. The image processing system 200 includes the image sensor 10 and the main processor 20.

Further, in FIG. 2, bold lines in the image processing system 200 indicate a flow of information, thin lines indicate a flow of transmission and reception of setting values, and dashed lines indicate a flow of image information in a case where the image information is to be output. Note that image processing systems according to the present technology are not limited to this embodiment.

The main processor 20 receives, from the image sensor 10, image information or encrypted information subjected to information processing in accordance with light from an object 21, and performs a development process. The main processor 20 includes a CPU 201, a register interface 202, an image information input unit 203, and a development processing unit 204.

The CPU 201 transmits a control signal for executing the respective functions of the image sensor 10 to the register interface 202 and the like, and transmits a command signal for executing the respective functions of the main processor 20 to each component.

The register interface 202 transmits the control signal from the CPU 201 to the register interface 15 of the image sensor 10.

In response to the command signal from the CPU 201, the image information input unit 203 inputs image information output from the image sensor 10.

In response to the command signal from the CPU 201, the development processing unit 204 performs a development process on an output image, in accordance with the image information received from the image information input unit 203.

Figure 3:
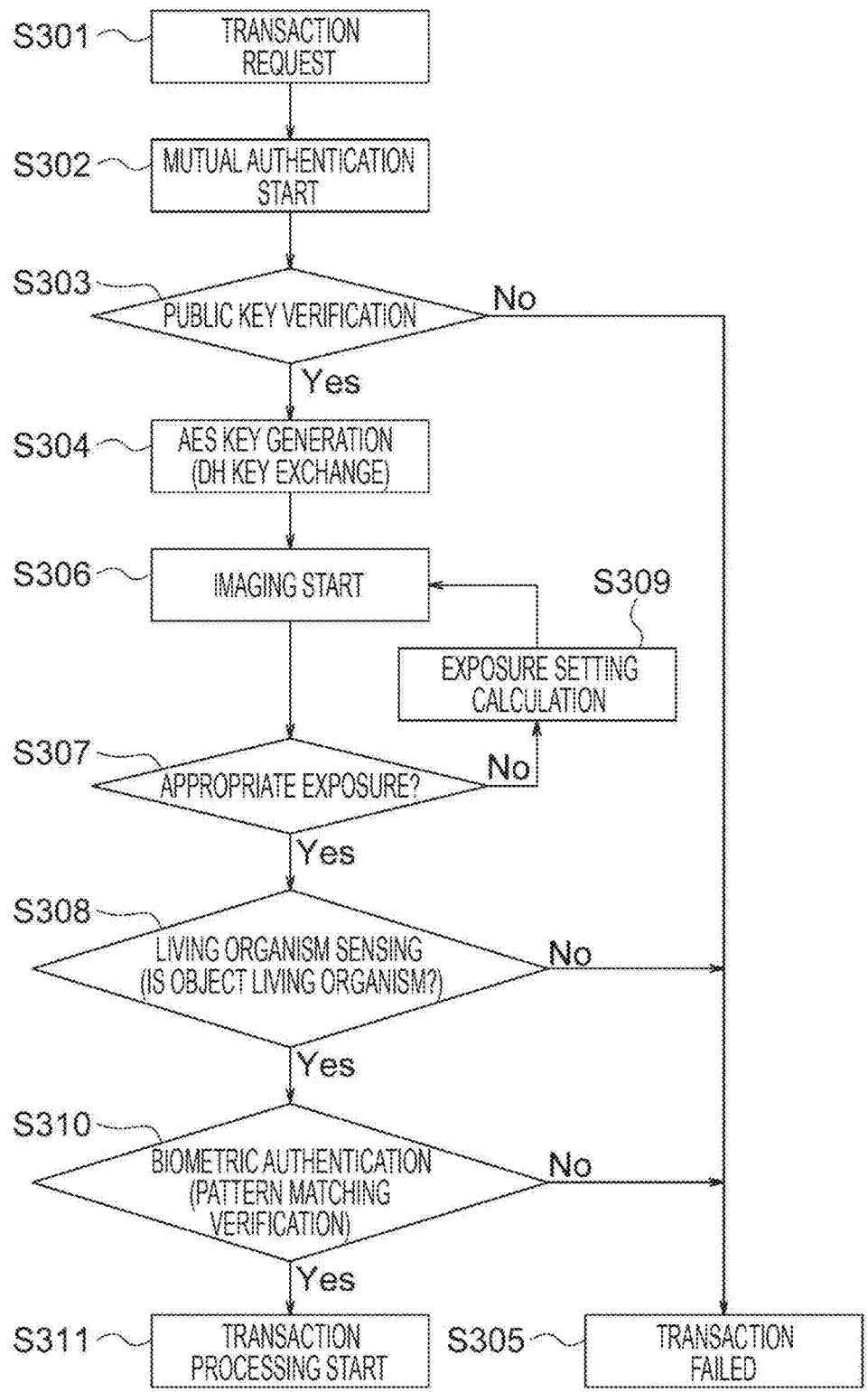
FIG. 3 is a flowchart for explaining a biometric authentication process using the image sensor according to the present technology.

3. Biometric Authentication Process Using the Image Sensor According to the Present Technology FIG. 3 is a flowchart for explaining a biometric authentication process using the image sensor according to the present technology. Referring to FIG. 3, the respective procedures in a biometric authentication process of this embodiment are now described.

First, in step S301, when the CPU 201 of the main processor 20 transmits a command signal indicating a request for a transaction such as settlement or the like to the image sensor 10 via the register interface 202 in accordance with a user operation, a series of processes is started.

In step S302, the encryption processing unit 105 of the image sensor 10, which has received the command signal indicating the transaction request, and the CPU 201 of the main processor 20 start mutual authentication as to whether or not both sides have a right of access to each other.

In step S303, the encryption processing unit 105 verifies the public key of the main processor 20, and the CPU 201 of the main processor 20 verifies the public key of the image sensor 10, to determine whether or not both public keys are authentic.

If the determination result is YES in step S303, or if it is confirmed that both public keys are authentic, the process moves on to step S304. If the determination result is NO in step S303, or if it cannot be confirmed that both public keys are authentic, the process moves on to step S305. Since the operation was performed by a person who is not authorized to conduct a transaction, it is determined that the transaction has failed, and the process comes to an end.

In step S304, the encryption processing unit 105 performs Diffie-Hellman key exchange (DH key exchange), to generate an Advanced Encryption Standard (AES) key, for example. After an AES key is generated by the encryption processing unit 105, the process moves on to step S306.

In step S306, the sensor unit 11 of the image sensor 10 images an iris or the like of the object 21, for example, to obtain biometric information about the object 21. After an iris or the like is imaged, the process moves on to step S307.

In step S307, the sensor unit 11 determines whether or not the exposure is appropriate. If the determination result is YES in step S307, or if the exposure is appropriate, the process moves on to step S308. If the determination result is NO in step S307, or if the exposure is not appropriate, the process moves on to step S309, and the sensor unit 11 calculates exposure settings, to achieve appropriate exposure. After appropriate exposure settings are calculated, the process returns to step S306, and the sensor unit 11 again images an iris or the like of the object 21.

Next, in step S308, the living organism determination unit 103 determines whether or not the object 21 is a living organism. More specifically, in the case of iris authentication, the living organism determination unit 103 performs the determination by measuring the dilation/contraction of the pupil, the reflectance of the object 21, and the like, for example. Thus, it is possible to prevent access by an imposter using a photograph, an image, or the like of the object 21.

If the determination result is YES in step S308, or if the object 21 is determined to be a living organism, the process moves on to step S310. If the determination result is NO in step S308, or if the object 21 is determined not to be a living organism, the process moves on to step S305. Since the operation was performed by a person who is not authorized to conduct a transaction, it is determined that the transaction has failed, and the process comes to an end.

In step S310, the biometric authentication unit 104 determines whether or not the biometric information acquired from the imaged object 21 matches the reference information that is about a person having an access right and is stored beforehand in the nonvolatile memory 14. In other words, the image sensor 10 of this embodiment performs so-called one-to-N(N being a natural number) comparison between the one piece of reference information stored in advance and biometric information acquired by the image sensor 10, to determine whether or not the acquired biometric information is biometric information about a specific user having an access right.

If the determination result is YES in step S310, or if the acquired biometric information matches the reference information, the process moves on to step S311, and transaction processing such as settlement or the like with the user is started. If the determination result is NO in step S310, or if the acquired biometric information does not match the reference information, the process moves on to step S305. Since the operation was performed by a person who is not authorized to conduct a transaction, it is determined that the transaction has failed, and the process comes to an end.

In step S311, the encryption processing unit 105 generates encrypted information by encrypting the biometric authentication information that has authenticated the living organism. The generated encrypted information is input to the output switch unit 106. After outputting the encrypted information is selected, the encrypted information is transmitted to the register interface 202 of the main processor 20 by the register interface 15. After that, the CPU 201 having received the encrypted information from the register interface 202 decrypts the encrypted information, and starts transaction processing such as settlement with the user.

An image sensor according to the present technology is an image sensor that performs encryption inside an image sensor using a conventional common key encryption technique as an example encryption technique, and outputs the encrypted information to the outside. However, encryption according to the present technology is not limited to the common key encryption technique. Here, the "common key encryption technique" refers to an encryption technique using a key common in encryption and decryption.

As described above, the image sensor 10 of this embodiment performs a biometric authentication process therein. Accordingly, there is no need to output RAW data of biometric information to the outside. Thus, the security of the biometric information can be enhanced, and the risk of information leakage can be lowered.

Furthermore, in a case where encrypted information is output from the image sensor 10 to the outside while image information is not output as in this embodiment, there is no need to prepare a large-capacity interface such as cables for outputting image information, and thus, the module design can be made simpler. In a case where a high-speed transmission line having a bandwidth on the order of GHz like an image sensor is designed as an ultra-thin module, it will be difficult to maintain high quality, because wires such as a plurality of cables are folded in a narrow area. In view of this, the large-capacity interface for outputting images is made unnecessary, so that the complexity of module design can be reduced.

Figure 4:
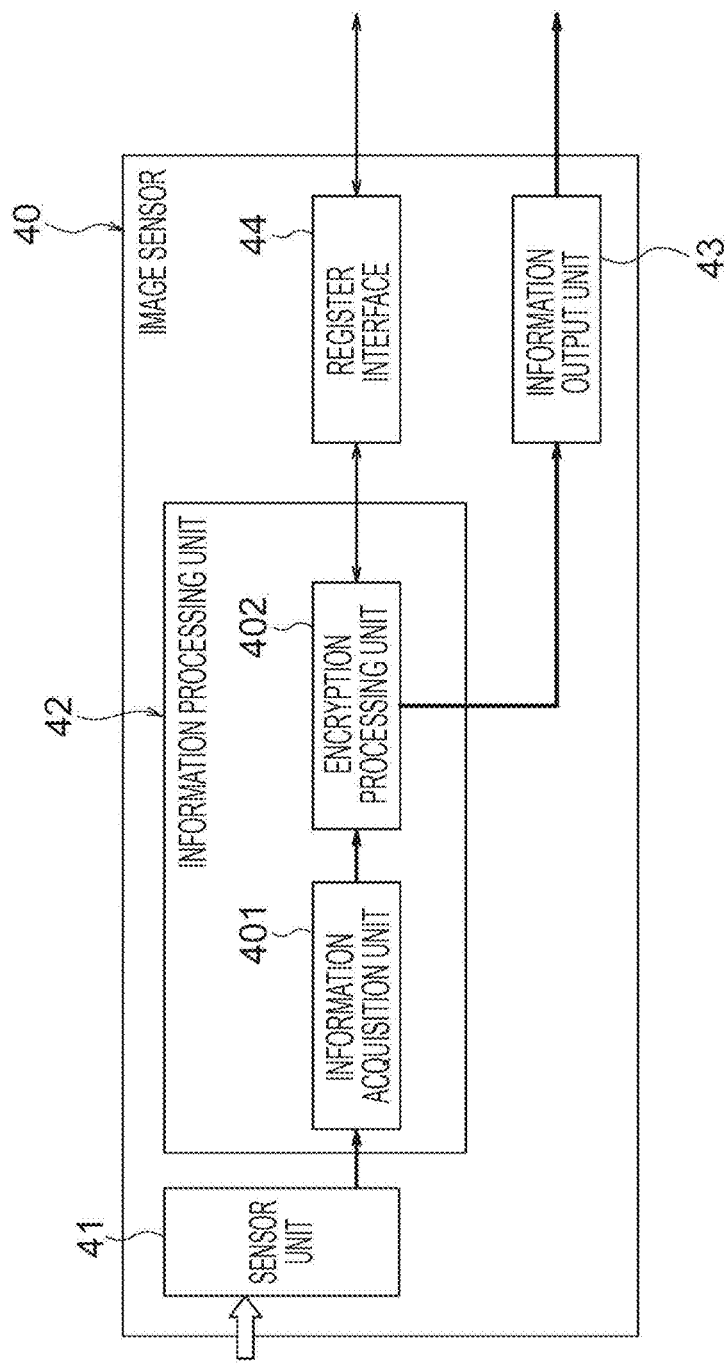
FIG. 4 is a block diagram showing an example configuration of an image sensor according to a conventional technology.

4. Example Configuration of an Image Sensor According to a Conventional Technology FIG. 4 is a block diagram showing an example configuration of an image sensor according to a conventional technology. Like the image sensor 10 according to the present technology, an image sensor 40 may be a CMOS image sensor, a CCD image sensor, or the like.

The image sensor 40 performs a biometric authentication process outside, and includes a sensor unit 41, an information processing unit 42, and an information output unit 43. The image sensor 40 also includes a register interface 44 that transmits and receives signals to and from the outside. The register interface 44 transmits and receives a control signal for an encryption processing unit 105 to perform processing.

The information processing unit 42 performs a process of encrypting acquired biometric information, and includes an information acquisition unit 401 and an encryption processing unit 402.

The information acquisition unit 401 performs A/D conversion on an electrical signal photoelectrically converted by the sensor unit 11 in accordance with light of the object imaged to perform biometric authentication on the user. By doing so, the information acquisition unit 401 acquires biometric information. The information acquisition unit 401 also performs A/D conversion on the electrical signal photoelectrically converted by the sensor unit 11 in accordance with the light of the subject imaged by the user, and thus, acquires image information.

The encryption processing unit 402 generates encrypted information by encrypting the acquired biometric information, and transmits the encrypted information to the information output unit 43.

The information output unit 43 receives the encrypted information or image information from the encryption processing unit 402, and outputs the received information to the outside.

Figure 5:
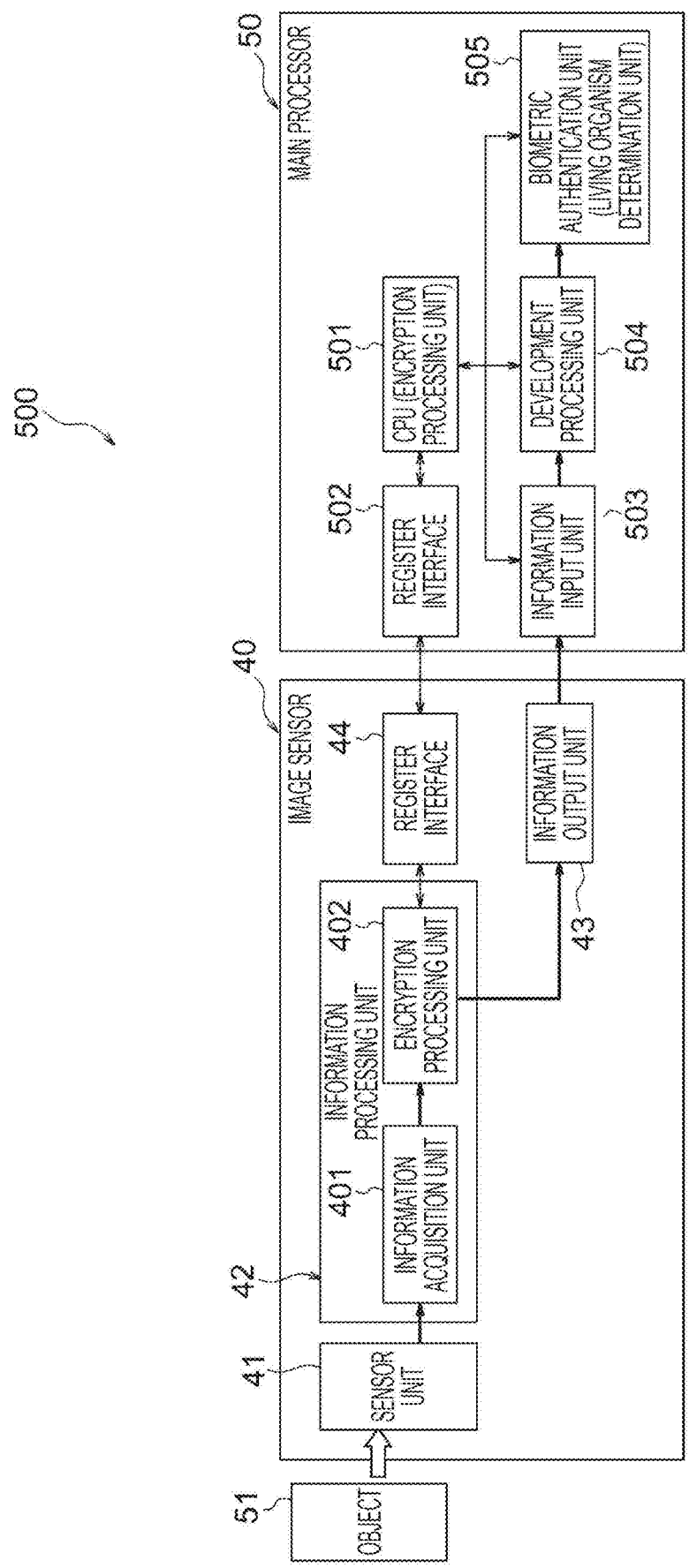
FIG. 5 is a block diagram showing an example configuration of an image processing system according to the conventional technology.

5. Example Configuration of an Image Processing System According to the Conventional Technology FIG. 5 is a block diagram showing an example configuration of an image processing system according to the conventional technology. An image processing system 500 is a system that can be used for a mobile terminal, a digital camera, a video camera, or the like, for example, and performs a development process. The image processing system 500 includes the image sensor 40 and a main processor 50. Further, in FIG. 5, bold lines in the image processing system 500 indicate a flow of information, and thin lines indicate a flow of transmission and reception of setting values.

The main processor 50 receives, from the image sensor 40, encrypted information or image information subjected to information processing in accordance with light from an object 51, and performs a biometric authentication process or a development process. The main processor 50 includes a CPU 501, a register interface 502, an information input unit 503, a development processing unit 504, and a biometric authentication unit 505.

The CPU 501 transmits a control signal for executing the respective functions of the image sensor 40 to the register interface 502 and the like, and transmits a command signal for executing the respective functions of the main processor 50 to each component. The CPU 501 also serves as an encryption processing unit that encrypts biometric authentication information subjected to a biometric authentication process.

The register interface 502 transmits the control signal from the CPU 501 to the register interface 44 of the image sensor 40.

In response to the command signal from the CPU 501, the information input unit 503 inputs encrypted information or image information output from the image sensor 40.

In response to the command signal from the CPU 501, the development processing unit 504 performs a development process on an output image, in accordance with the image information received from the information input unit 503.

The biometric authentication unit 505 compares the biometric information determined to be able to authenticate the user with reference information acquired from the outside, to determine whether or not the user has a right to usage. Note that the biometric authentication unit 505 also serves as a living organism determination unit that determines whether or not encrypted biometric information can authenticate the user.

Figure 6:
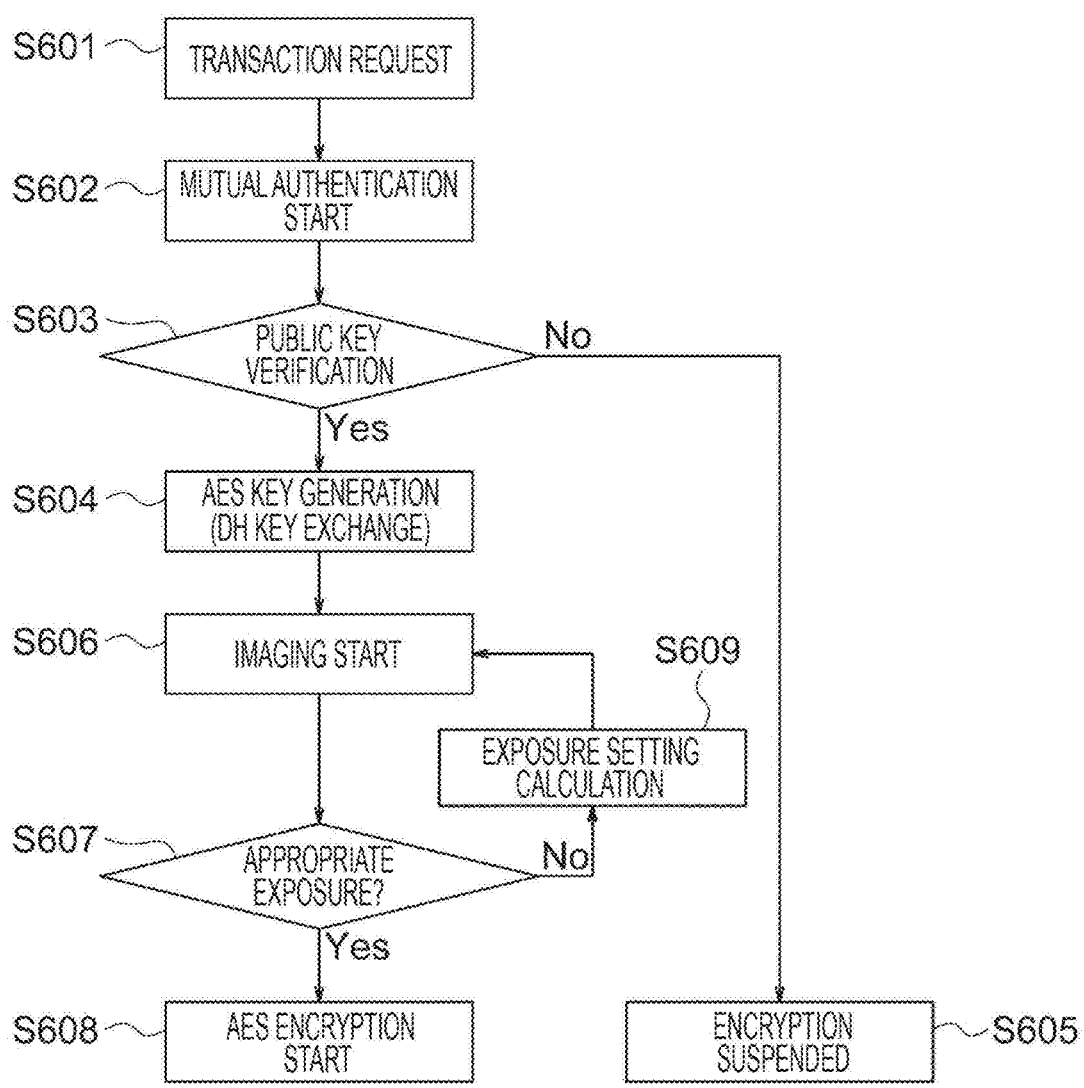
FIG. 6 is a flowchart for explaining a biometric authentication process using the image sensor according to the conventional technology.

6. Biometric Authentication Process Using the Image Sensor According to the Conventional Technology FIG. 6 is a flowchart for explaining a biometric authentication process using the image sensor according to the conventional technology. Referring to FIG. 6, the respective procedures in a biometric authentication process according to the conventional technology are now described.

First, in step S601, when the CPU 501 of the main processor 50 transmits a command signal indicating a request for a transaction such as settlement or the like to the image sensor 40 via the register interface 502 in accordance with a user operation, a series of processes is started.

In step S602, the encryption processing unit 402 of the image sensor 40, which has received the command signal indicating the transaction request, and the CPU 501 of the main processor 50 start mutual authentication as to whether or not both sides have a right of access to each other.

In step S603, the encryption processing unit 402 verifies the public key of the main processor 50, and the CPU 501 of the main processor 50 verifies the public key of the image sensor 40, to determine whether or not both public keys are authentic.

If the determination result is YES in step S603, or if it is confirmed that both public keys are authentic, the process moves on to step S604. If the determination result is NO in step S603, or if it cannot be confirmed that both public keys are authentic, the process moves on to step S605. Since the operation was performed by a person who is not authorized to conduct a transaction, the encryption is suspended, and the process comes to an end.

In step S604, the encryption processing unit 402 generates an Advanced Encryption Standard (AES) key, and performs Diffie-Hellman key exchange (DH key exchange), for example. After an AES key is generated by the encryption processing unit 402, the process moves on to step S606.

In step S606, the sensor unit 41 of the image sensor 40 images an iris or the like of the object 51, for example, to obtain biometric information about the object 51. After an iris or the like is imaged, the process moves on to step S607.

In step S607, the sensor unit 41 determines whether or not the exposure is appropriate. If the determination result is YES in step S607, or if the exposure is appropriate, the process moves on to step S608. If the determination result is NO in step S607, or if the exposure is not appropriate, the process moves on to step S609, and the sensor unit 41 calculates exposure settings, to achieve appropriate exposure. After appropriate exposure settings are calculated, the process returns to step S606, and the sensor unit 41 again images an iris or the like of the object 51.

Next, in step S608, the CPU 501 starts AES encryption of the acquired biometric information. After that, the biometric authentication unit (a living organism determination unit) 505 of the main processor 50 compares the biometric information with the reference information stored in a server or the like, and determines whether or not the biometric information matches the reference information. In a case where the biometric information matches the reference information, the CPU 501 starts transaction processing such as settlement with the user.

As described above, in a case where a biometric authentication process using the image sensor 40 according to a conventional technology is performed, the biometric authentication process is performed in the main processor 50 outside the image sensor 40. Therefore, it is necessary to output the RAW data of biometric information from the image sensor 40 to the main processor 50. Because of this, even if the RAW data of biometric information is encrypted, there is a possibility that the encrypted data is decrypted, and the information leaks. In such a case, security is far from perfect. To solve this problem, an image sensor according to the present technology enhances the security of biometric information by performing a biometric authentication process inside the image sensor.

Figure 7:
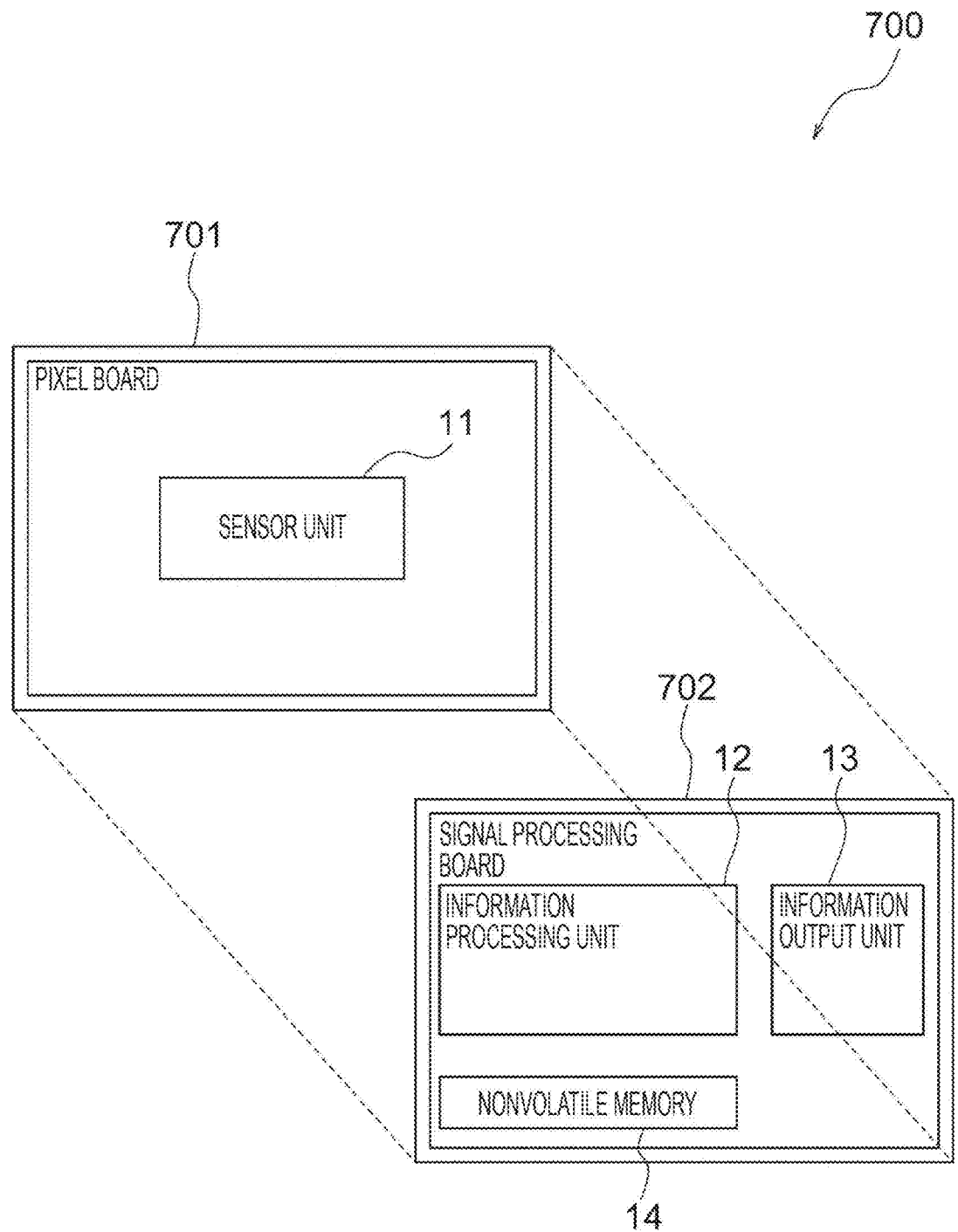
FIG. 7 is a block diagram showing a first example stack in an image sensor according to the present technology.

7. First Example Stack in an Image Sensor According to the Present Technology FIG. 7 is a block diagram showing an example stack in a first embodiment of a stacked image sensor according to the present technology. The stacked image sensor may be stacked CMOS image sensor, for example, but the present technology is not limited to a stacked CMOS image sensor. Further, the CMOS image sensor may be of a back-illuminated type. A back-illuminated CMOS image sensor has a structure in which pixels, circuits, and the like are formed on a silicon substrate, and the thickness of a silicon substrate on the back side of the image sensor is reduced to several micrometers so as to capture light.

As shown in FIG. 7, in a stacked image sensor 700 of this embodiment, two boards are stacked, as a signal processing board 702 is disposed on the back side of a pixel board 701 provided with the sensor unit 11 that photoelectrically converts light from the object 21 into an electrical signal. The information processing unit 12, the information output unit 13, and the nonvolatile memory 14 shown in FIG. 1 are provided on the signal processing board 702.

As in the image sensor 700 of this embodiment, a two-layer stack structure is formed with the signal processing board 702 disposed on the pixel board 701. With this arrangement, biometric information cannot be easily read or analyzed from outside, and thus, the security of biometric information can be enhanced.

Figure 8:
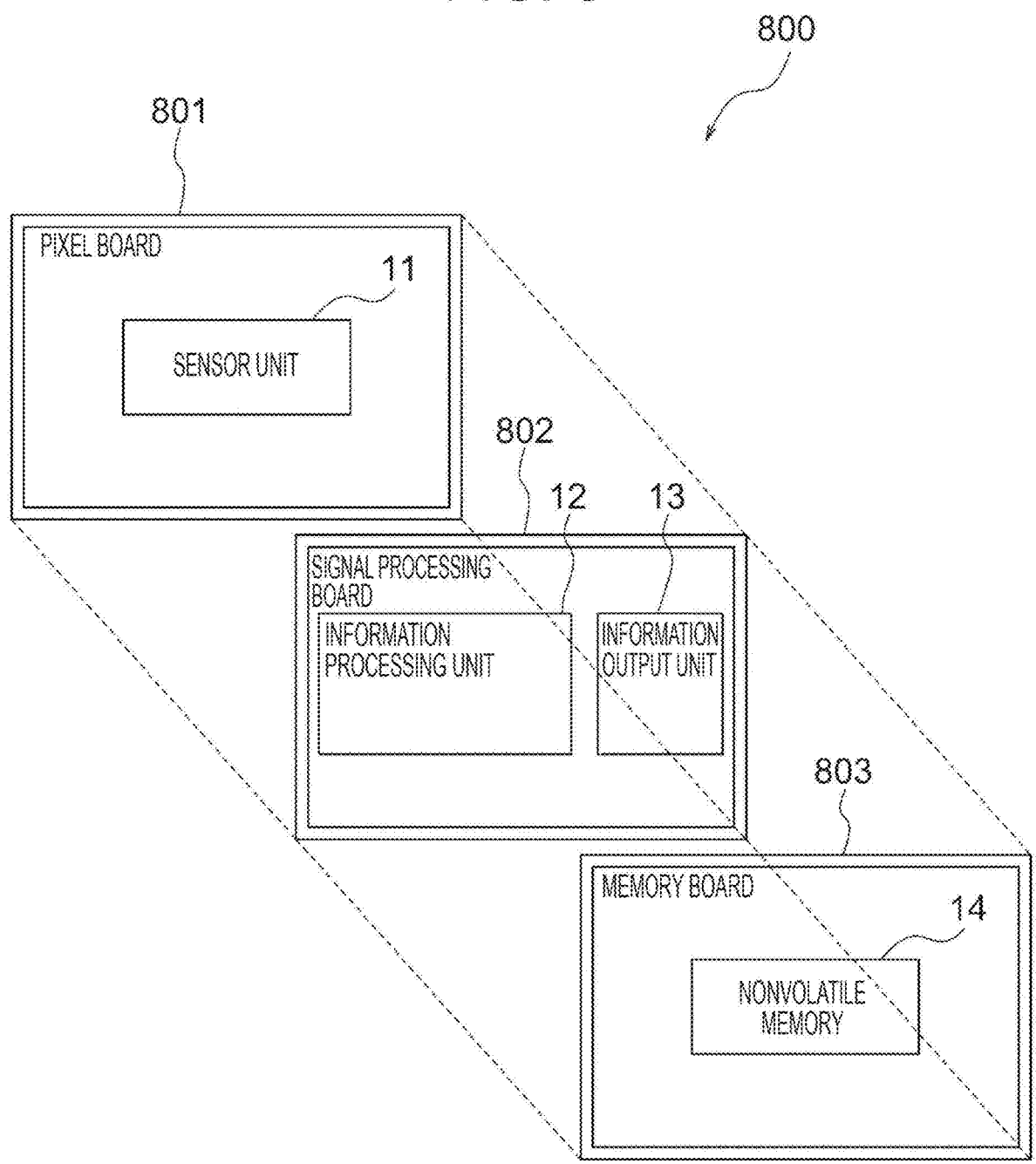
FIG. 8 is a block diagram showing a second example stack in an image sensor according to the present technology.

8. Second Example Stack in an Image Sensor According to the Present Technology FIG. 8 is a block diagram showing an example stack in a second embodiment of a stacked image sensor according to the present technology. As in FIG. 8, the stacked image sensor may be a stacked CMOS image sensor, for example, but the present technology is not limited to a stacked CMOS image sensor.

As shown in FIG. 8, in a stacked image sensor 800 of this embodiment, three boards are stacked, as a signal processing board 802 is interposed between a pixel board 801 provided with the sensor unit 11 and a memory board 803. The information processing unit 12 and the information output unit 13 are provided on the signal processing board 802. Meanwhile, the nonvolatile memory 14 is provided on the memory board 803.

As in the image sensor 800 of this embodiment, a three-layer stack structure is formed with the pixel board 801 and the memory board 803 covering the front surface and the back surface of the signal processing board 802. With this arrangement, it is more difficult to read or analyze biometric information from outside than with the two-layer stack structure shown in FIG. 7, and thus, the security of biometric information can be further enhanced.

Note that embodiments of the present technology are not limited to the above described embodiments, and various modifications may be made to them without departing from the scope of the present technology. For example, it is possible to adopt a combination of all or some of the above described plurality of embodiments. Specifically, an image sensor according to the present technology can be applied to a device that determines whether or not the person scheduled to drive a vehicle such as an automobile is authorized to drive the vehicle, a device that performs entry and exit management at an entrance/exit of a building, the unlocking function of a mobile terminal such as a smartphone, or the like, for example.

The present technology may also be embodied in the configurations described below.

(1) An image sensor including: a biometric information acquisition unit that acquires biometric information; a storage unit that stores reference information to be compared with the biometric information; and a biometric authentication unit that performs biometric authentication by comparing the biometric information with the reference information.

(2) The image sensor according to (1), further including an encryption processing unit that encrypts biometric authentication information that authenticates a living organism.

(3) The image sensor according to (2), further including an encrypted information output unit that outputs encrypted information obtained by encrypting the biometric authentication information.

(4) The image sensor according to (3), further including: an image information acquisition unit that acquires image information; and an image information output unit that outputs the image information, in which an output band of the image information output unit is wider than an output band of the encrypted information output unit.

(5) The image sensor according to (4), further including an output switch unit that selectively switches between the image information and the encrypted information, and outputs the image information or the encrypted information.

(6) The image sensor according to (1), further including a biometric information determination unit that determines whether or not the biometric information is information that can be compared with the reference information.

(7) The image sensor according to (1), in which the biometric information is iris information.

(8) The image sensor according to (1), in which the image sensor is of a stacked type that has a pixel board and a signal processing board stacked on each other, the biometric authentication unit being provided on the signal processing board.

(9) An image processing system including:
an image sensor including: a biometric information acquisition unit that acquires biometric information; a storage unit that stores reference information to be compared with the biometric information; a biometric authentication unit that performs biometric authentication by comparing the biometric information with the reference information; an encryption processing unit that encrypts biometric authentication information that authenticates a living organism; and an encrypted information output unit that outputs encrypted information obtained by encrypting the biometric authentication information; and a processor that performs processing in accordance with the encrypted information output from the image sensor.

REFERENCE SIGNS LIST 10, 40, 700, 800 Image sensor
11, 41 Sensor unit
12, 42 Information processing unit
13 Information output unit
14 Nonvolatile memory
15, 44, 202, 502 Register interface
20, 50 Main processor
21, 51 Object
43 Information output unit
101 Image information acquisition unit
102, 401 Biometric information acquisition unit
103 Living organism determination unit
104, 505 Biometric authentication unit
105, 402 Encryption processing unit
106 Output switch unit
107 Image information output unit
200, 500 Image processing system
201, 501 CPU
203, 503 Information input unit
204, 504 Development processing unit
701, 801 Pixel board
702, 802 Signal processing board
803 Memory board

The invention claimed is:

1. An image sensor comprising:
a processor inside the image sensor; and
circuitry configured to function as:
a biometric information acquisition unit that acquires biometric information;
a storage unit that stores reference information to be compared with the biometric information; and
a biometric authentication unit that performs, via the processor inside the image sensor, biometric authentication by comparing the biometric information with the reference information without outputting the biometric information outside the image sensor unless the outputting of the biometric information outside the image sensor is selected.

2. The image sensor according to claim 1, further comprising
an encryption processing unit that encrypts biometric authentication information that authenticates a living organism.

3. The image sensor according to claim 2, further comprising
an encrypted information output unit that outputs encrypted information obtained by encrypting the biometric authentication information.

4. The image sensor according to claim 3, further comprising: an image information acquisition unit that acquires image information; and an image information output unit that outputs the image information, wherein an output band of the image information output unit is wider than an output band of the encrypted information output unit.

5. The image sensor according to claim 4, further comprising
an output switch unit that selectively switches between the image information and the encrypted information, and outputs the image information or the encrypted information.

6. The image sensor according to claim 1, further comprising
a living organism determination unit that determines whether or not the biometric information is information comparable with the reference information.

7. The image sensor according to claim 1, wherein the biometric information is iris information.

8. The image sensor according to claim 1, wherein the image sensor is of a stacked type that has a pixel board and a signal processing board stacked on each other, the biometric authentication unit being provided on the signal processing board.

9. An image processing system comprising:
an image sensor including:
  a first processor inside the image sensor; and
  circuitry configured to function as:
    a biometric information acquisition unit that acquires biometric information;
    a storage unit that stores reference information to be compared with the biometric information;
    a biometric authentication unit that performs, via the first processor inside the image sensor, biometric authentication by comparing the biometric information with the reference information without outputting the biometric information outside the image sensor unless the outputting of the biometric information outside the image sensor is selected;
    an encryption processing unit that encrypts biometric authentication information that authenticates a living organism; and
    an encrypted information output unit that outputs encrypted information obtained by encrypting the biometric authentication information; and
  a second processor outside the image sensor, wherein the second processor is configured to perform processing in accordance with the encrypted information output from the image sensor.

* * * * *